(12) United States Patent
Williams et al.

(10) Patent No.: US 7,448,133 B2
(45) Date of Patent: Nov. 11, 2008

(54) PROCEDURE FOR REPLACEMENT OF ACOUSTIC LINER IN INTEGRATED EXHAUST DUCT MUFFLER FOR USE WITH AIRBORNE AUXILIARY POWER UNITS

(75) Inventors: Nicholas A. Williams, Phoenix, AZ (US); Susan E. Yip, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 737 days.

(21) Appl. No.: 10/999,242

(22) Filed: Nov. 30, 2004

(65) Prior Publication Data

US 2006/0059674 A1 Mar. 23, 2006

Related U.S. Application Data

(60) Provisional application No. 60/612,674, filed on Sep. 23, 2004.

(51) Int. Cl.
*B21D 51/16* (2006.01)
(52) U.S. Cl. .................. 29/890.08; 29/402.08; 29/889.1
(58) Field of Classification Search ................ 29/890.8, 29/896.2, 402.02, 402.03, 402.08, 426.1, 29/525.01, 889.1, 889.2; 181/213, 265, 264, 181/256; 60/272, 273
See application file for complete search history.

(56) References Cited

U.S. PATENT DOCUMENTS 3,948,346 A 4/1976 Schindler (Continued)

FOREIGN PATENT DOCUMENTS

EP 1 010 618 A2 6/2000
EP 1 391 597 A2 2/2004

OTHER PUBLICATIONS

PCT International Search Report PCT/US2005/034187, Feb. 1, 2006.

*Primary Examiner*—David P. Bryant
*Assistant Examiner*—Donte Kirksey
(74) *Attorney, Agent, or Firm*—Ingrassia, Fisher & Lorenz, P.C.

(57) ABSTRACT

The present invention provides a method for replacing an acoustic liner through the forward end or aft end of an integrated exhaust duct muffler ("IEDM"). The IEDM includes a bellmouth coupled to a forward end of the IEDM and an exhaust pipe coupled to an aft end of the IEDM. A muffler section, including the acoustic liner, is positioned between the bellmouth and exhaust pipe. In one embodiment, the method of replacing the acoustic liner from the forward end of the IEDM includes decoupling the bellmouth and forward end cap of the muffler section from the forward end of the IEDM and withdrawing the acoustic liner from the muffler section. A new acoustic liner is then inserted into the muffler section and the bellmouth and forward end cap are recoupled to the forward end of the IEDM. In another embodiment, a method of replacing an acoustic liner of an IEDM from an aft end is disclosed. The method includes removing the exhaust pipe from the aft end of the IEDM and withdrawing the acoustic liner from the muffler section. A new acoustic liner is then inserted into the muffler section and the exhaust pipe is attached to the aft end of the IEDM. In another embodiment, a method of replacing an acoustic liner of an IEDM from a forward end is disclosed. The method includes removing the bellmouth from the IEDM and withdrawing the acoustic liner from the muffler section. A new acoustic liner is inserted into the muffler section and the bellmouth is reattached to the IEDM.

14 Claims, 4 Drawing Sheets

U.S. PATENT DOCUMENTS

| | | | |
|---|---|---|---|
| 4,137,992 A * | 2/1979 | Herman | 181/213 |
| 4,235,303 A * | 11/1980 | Dhoore et al. | 181/214 |
| 4,969,535 A | 11/1990 | Arcas et al. | |
| 5,127,602 A * | 7/1992 | Batey et al. | 244/1 N |
| 5,430,935 A | 7/1995 | Yaworsky et al. | |
| 5,782,082 A | 7/1998 | Hogeboom et al. | |
| 5,952,625 A * | 9/1999 | Huff | 181/265 |
| 6,082,488 A * | 7/2000 | Lin | 181/256 |
| 6,148,517 A | 11/2000 | Johnson et al. | |
| 6,286,623 B1 * | 9/2001 | Shaya | 181/264 |
| 6,345,441 B1 | 2/2002 | Farmer et al. | |
| 6,505,706 B2 * | 1/2003 | Tse | 181/213 |
| 6,546,627 B1 | 4/2003 | Sekihara et al. | |
| 6,568,079 B2 | 5/2003 | Farmer et al. | |
| 6,615,576 B2 | 9/2003 | Sheoran et al. | |
| 2002/0139120 A1 | 10/2002 | Sheoran et al. | |
| 2004/0088988 A1 | 5/2004 | Swaffar | |

* cited by examiner

PROCEDURE FOR REPLACEMENT OF ACOUSTIC LINER IN INTEGRATED EXHAUST DUCT MUFFLER FOR USE WITH AIRBORNE AUXILIARY POWER UNITS

CROSS-REFERENCES TO RELATED APPLICATIONS

This application claims the benefit of U.S. Provisional Application No. 60/612,674, filed Sep. 23, 2004.

TECHNICAL FIELD

The present invention relates to auxiliary power units and, more particularly, to replacement of an acoustic liner in an integrated exhaust duct muffler for use with an auxiliary power unit.

BACKGROUND

Many modern aircraft are equipped with an airborne auxiliary power unit ("APU") that provides electrical and pneumatic power to various parts of the aircraft for such tasks as environmental control, lighting, powering electronics, main engine starting, etc. In order to utilize an airborne APU, various installation systems must be included with the APU. Some of the principle systems include mounts, inlet and exhaust, and pneumatic (bleed) and fire containment systems, including systems for detecting and extinguishing fires. FIG. 1 shows a typical airborne APU 100 installed in the tailcone of an aircraft (shown in dashed outline 105). Some of the key systems include an inlet system 110, a mount system 115, a pneumatic system 120 and an exhaust system 125.

The exhaust system 125 for an aircraft performs many functions, including evacuating APU exhaust gas from the aircraft, attenuating exhaust noises, and providing compartment cooling airflow when used in conjunction with an eductor system. The functional design aspects of these duties are often integrated into a single component to reduce weight. This single component will hereinafter be referred to as an integrated exhaust duct muffler ("IEDM"). Unfortunately, the compromises between functionality, reliability, cost, and weight often result in a part that will need repair work one or more times in its lifetime. The part of the IEDM that will most often need repair, or rather replacement, is the acoustic liner. This is because the thermal cycling and harsh environment that the acoustic liner is exposed to makes it rather brittle and subject to cracking. Because of potentially aggressive weight and cost targets, the design of an IEDM may not lend itself to simple and straightforward repair methods for replacing an acoustic liner.

Accordingly, there is a need for repair procedures for replacement of an acoustic liner in an integrated exhaust duct muffler so that the useful life of the remainder of the integrated exhaust duct muffler can be extended. Furthermore, other desirable features and characteristics of the present invention will become apparent from the subsequent detailed description and the appended claims, taken in conjunction with the accompanying drawings and the foregoing technical field and background

BRIEF SUMMARY

The present invention provides methods for replacing an acoustic liner in an integrated exhaust duct muffler. Methods are disclosed for removing the acoustic liner from either the forward end or the aft end of the integrated exhaust duct muffler. An integrated exhaust duct muffler incorporating an acoustic liner is also disclosed.

In one embodiment, and by way of example only, a method of replacing an acoustic liner from a forward end of an IEDM is disclosed. The IEDM includes a bellmouth, a muffler section, and an exhaust pipe. The muffler section, which includes the acoustic liner, is positioned between the bellmouth and the exhaust pipe. The bellmouth and the acoustic liner are separately coupled to a forward end cap of the muffler section. The method of replacing the acoustic liner from the forward end of the IEDM includes removing the subassembly consisting of the bellmouth, acoustic liner, and forward end cap of the muffler section from the IEDM. The acoustic liner is then removed from said subassembly and replaced with a new acoustic liner. The subassembly consisting of the bellmouth, a new acoustic liner, and the forward and cap are then reinserted into the IEDM and the reattached thereto.

In another embodiment, and by way of example only, a method of replacing an acoustic liner from an aft end of an IEDM is disclosed. The method includes removing the exhaust pipe from the aft end of the IEDM and withdrawing the acoustic liner from the muffler section. A new acoustic liner is then inserted into the muffler section and the exhaust pipe is attached to the aft end of the IEDM.

In another embodiment, and by way of example only, a method of replacing an acoustic liner from a forward end of an IEDM is disclosed. The IEDM includes a bellmouth coupled to a forward end of the IEDM and an exhaust pipe coupled to an aft end of the IEDM. A muffler section, including the acoustic liner, is positioned between the bellmouth and exhaust pipe. The method of replacing the acoustic liner from the forward end of the IEDM includes removing the bellmouth from the forward end of the IEDM and withdrawing the acoustic liner from the muffler section. A new acoustic liner is then inserted into the muffler section and the bellmouth is attached to the forward end of the IEDM.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

Figure 1:
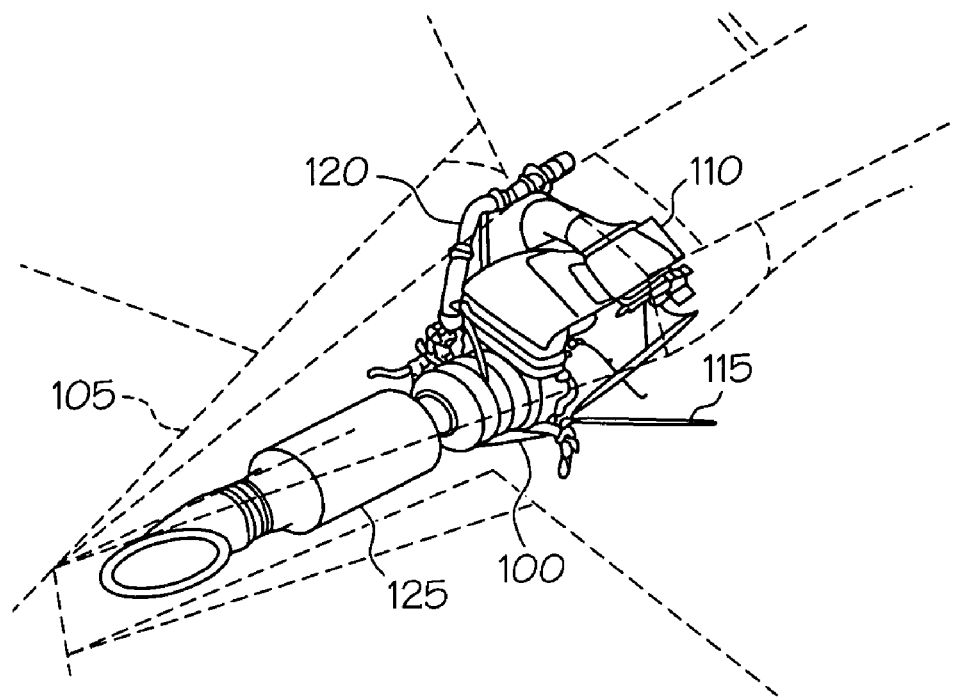
FIG. 1 shows a typical airborne auxiliary power unit and some of the key systems required for proper operation of the auxiliary power unit installed in the tailcone of an aircraft.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Also, the use of "inside diameter," "outside diameter," "circumference," or "cylinder" or any other variation thereof, or references to the circumferential geometry of the present invention are used to described the preferred embodiment of the inventions. Other envelopes, such as elliptical, conical, ellipto-conical, or polygonal, and other variations and combinations are intended to be within the scope of this disclosure. When "outside diameter" is used in reference to a "cylinder" it should be understood that the equivalent surface/feature of an alternate envelope geometry is also implied.

The invention may be described herein in terms of components and various processing steps. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present invention is directed to an IEDM that has an acoustic liner. The IEDM incorporates into a single unit the functional details required to provide:
- A flow path to allow APU exhaust gases to safely exit the aircraft in which the IEDM is installed;
- A flow entrainment bellmouth for an eductor system;
- Sound attenuation to reduce acoustic signature of the APU;
- Mounting provisions that accommodate radial and axial thermal growth.

Figure 2:
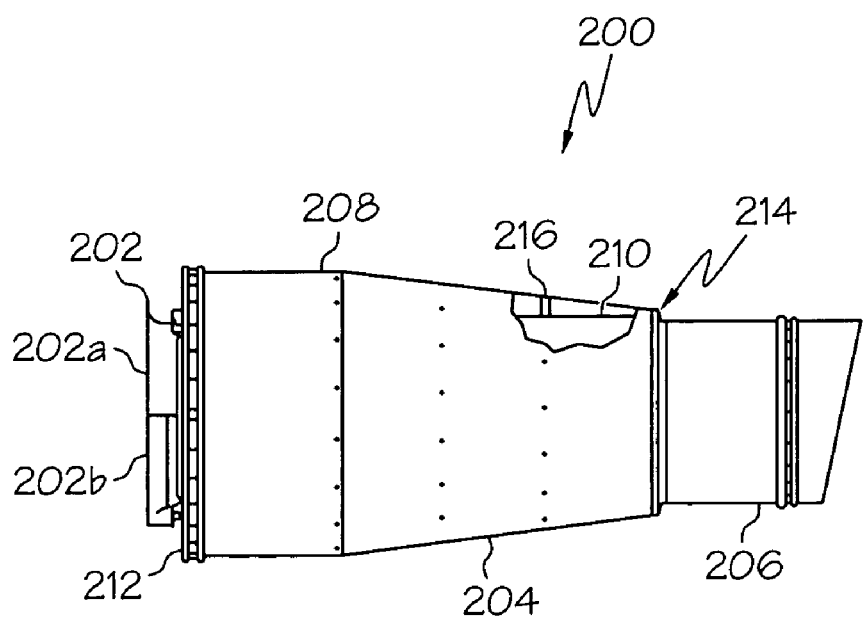
FIG. 2 shows a side view of one embodiment of an integrated exhaust duct muffler.
Figure 3:
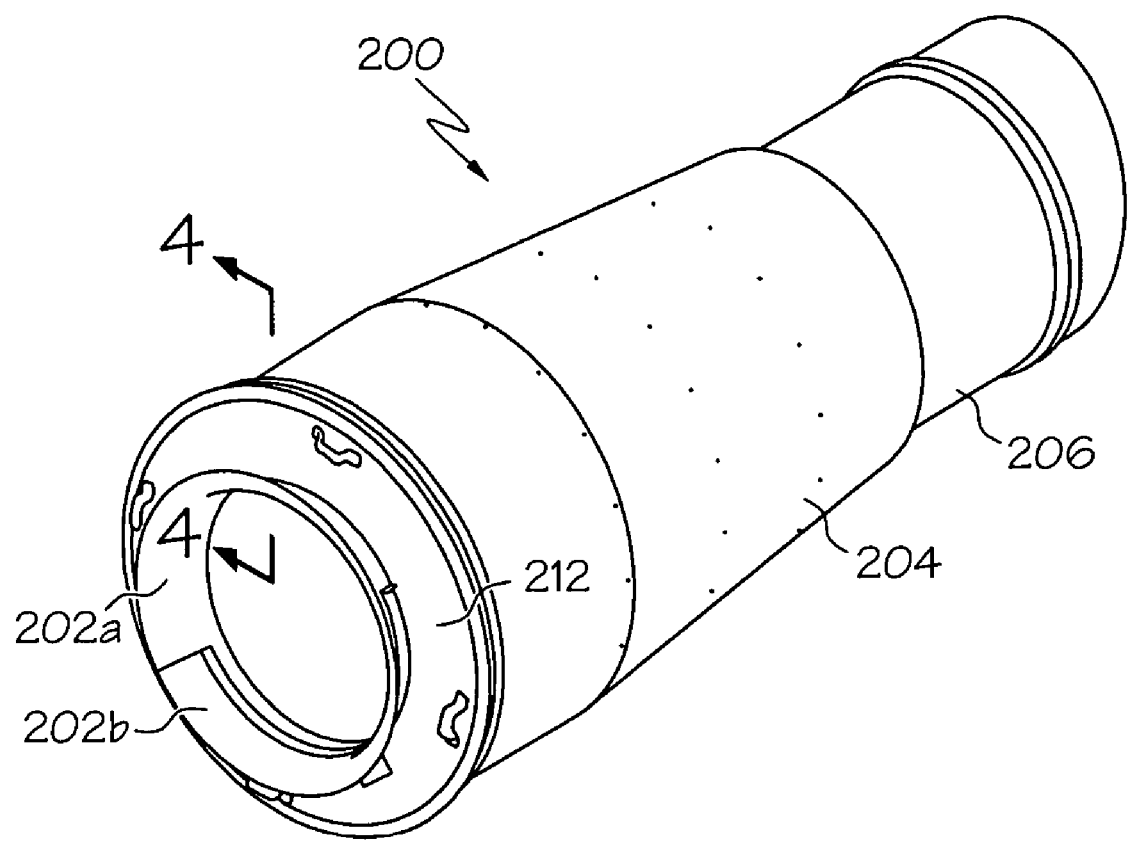
FIG. 3 shows a front isometric view of the integrated exhaust duct muffler of FIG. 2.

FIG. 2 shows a side view and FIG. 3 shows a front isometric view of one embodiment of an IEDM 200 which includes a bellmouth 202, a muffler section 204, and an exhaust pipe 206. The bellmouth 202 is a two piece assembly with one piece 202a permanently attached to the IEDM and the other piece 202b attached via threaded fasteners to facilitate installation and removal of an APU. In FIG. 2, a portion of the outer skin 208 has been cut away to reveal an acoustic liner 210 and one of a plurality of baffles 216 inside the muffler section 204. The outer skin 208 may be covered with a removable thermal blanket (not shown). The various sections of the IEDM 200, and details therein, can be joined together by a number of means, including, but not limited to, welding, brazing, bonding, and mechanical fasteners, such as rivets, screws, or bolts. The IEDM 200 may use one or more of these methods to assemble the part.

Figure 4:
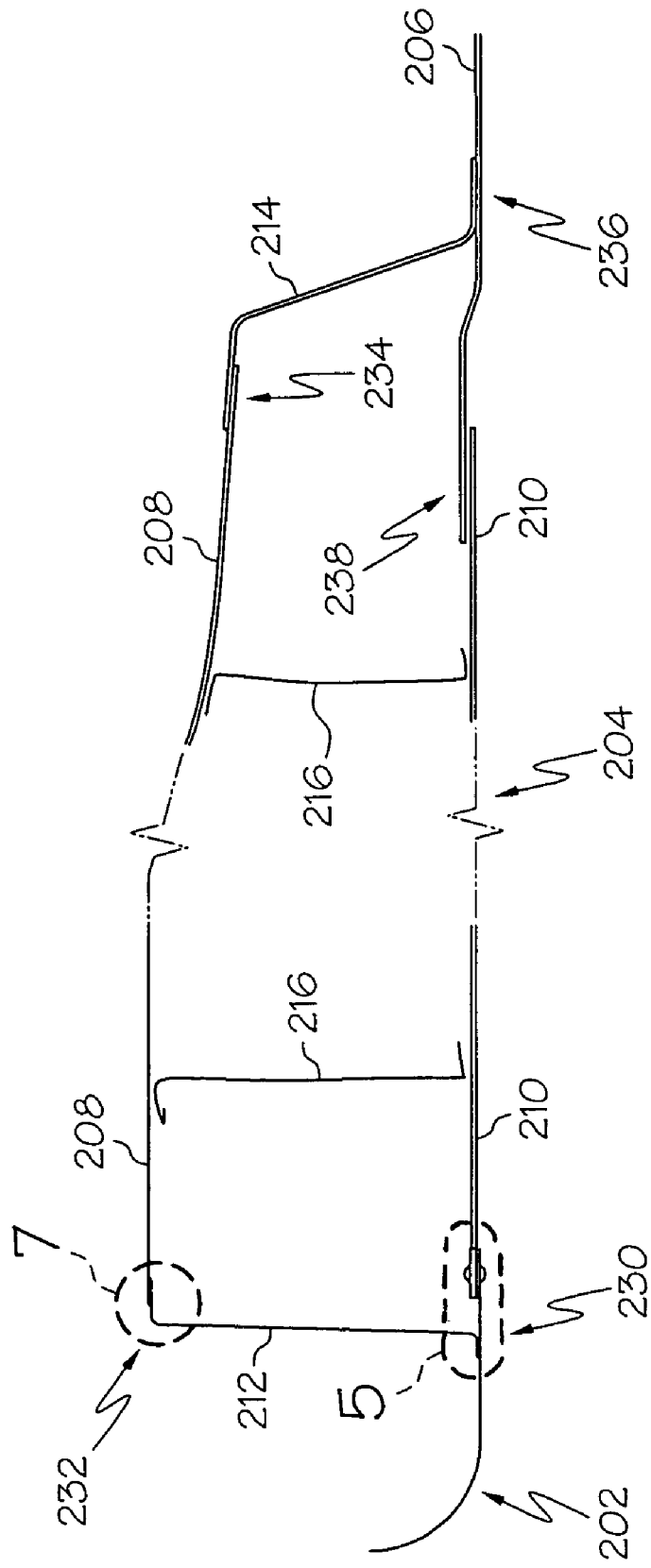
FIG. 4 is a cross-sectional view taken at 4-4 in FIG. 3 showing the layout and key joints of the integrated exhaust duct muffler.

FIG. 4 is a cross-sectional view taken at 4-4 of FIG. 3 showing the layout and key joints of the IEDM 200. The muffler section 204 includes of an outer skin 208 surrounding a replaceable acoustic liner 210, a forward end cap 212, an aft end cap 214, and a plurality of baffles 216. The outer skin 208 and acoustic liner 210 are often cylindrical in shape, but can also be an elliptical or irregular polygonal shape. The forward end cap 212 and aft end cap 214 are of a shape suitable to accommodate the muffler section 204 and the adjoining sections of the IEDM 200. The plurality of baffles 216, whose quantity and size are dependent on the acoustic needs of each aircraft model and mission profile, are formed sheet metal rings that attach to the outer skin 208 on their outside and provide support for the acoustic liner 210 on their inside and allow the acoustic liner 210 to slide relative to them. The exhaust pipe 206 is a formed sheet metal component that provides a flow path for APU exhaust gasses from the muffler section 200 overboard the aircraft.

In order to better understand the acoustic liner 210 replacement, the key joints in the IEDM 200 are described in the following paragraphs. The first joint 230 is at the interface(s) of the bellmouth 202, forward end cap 212 and acoustic liner 210. The second joint 232 is at the interface of the forward end cap 212 and the outer skin 208. The third joint 234 is at the interface of the aft end cap 214 and outer skin 208. The fourth joint 236 is at the interface of the aft end cap 214 and exhaust pipe 206.

Figure 5:
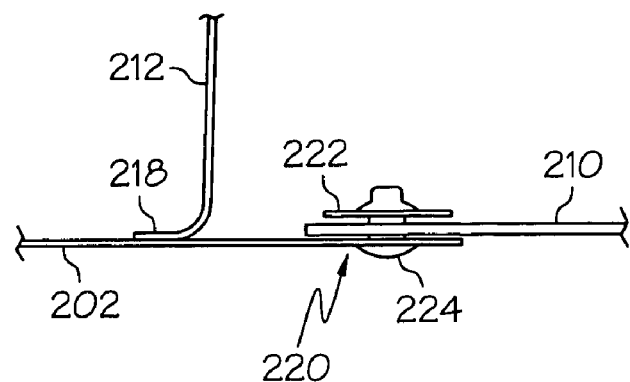
FIG. 5 is a cross-sectional view of a joint between the bellmouth, forward end cap and acoustic liner illustrating a configuration hereinafter referred to as a Type I configuration.
Figure 6:
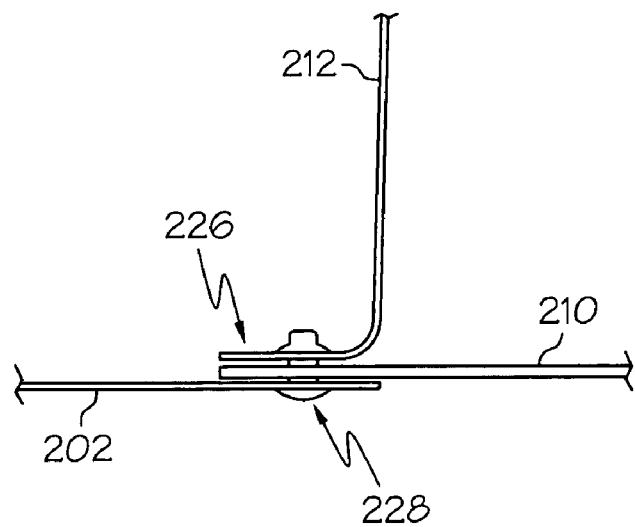
FIG. 6 is a cross-sectional view of a joint between the bellmouth, forward end cap and acoustic liner illustrating a configuration hereinafter referred to as a Type II configuration.

FIGS. 5 and 6 show two configurations of the first joint 230 used to connect the bellmouth 202, forward end cap 212 and acoustic liner 210. The first configuration is a multiple interface configuration (designated Type I configuration) and the second configuration is a single interface configuration (designated Type II configuration). (It should be noted that the Type designations set forth herein are arbitrary and for a matter of convenience only, and are not intended to denote any standard or regulated configurations known in the art.)

FIG. 5 illustrates the Type I configuration, which includes both a welded joint 218 and a fastened joint 220. The welded joint 218 is between the aft portion of the bellmouth 202 and the forward end cap 212. The fastened joint 220 is between the aft portion of the bellmouth 202, the acoustic liner 210, and a backing strip 222 (if so equipped). The fastened joint 220 is accomplished using mechanical fasteners 224.

FIG. 6 illustrates the Type II configuration, which is a simpler design. The three connecting components (the forward end cap 212, the aft portion of the bellmouth 202 and the acoustic liner 210) all come together at a fastened joint 226 and are held together with mechanical fasteners 228.

Figure 7:
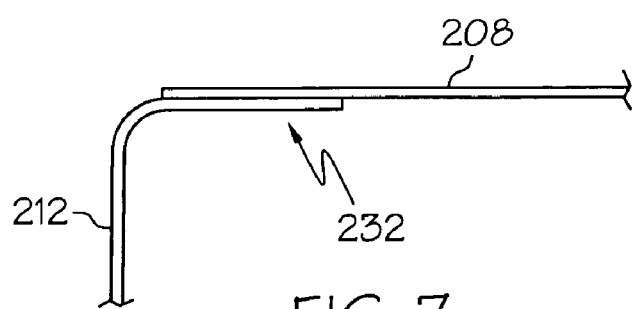
FIG. 7 is a cross-sectional view of a joint between the forward end cap and the outer skin.

FIG. 7 illustrates the second joint 232, which is the connection between the forward end cap 212 and the outer skin 208. The joint 232 between the forward end cap 212 and outer skin 208 is generally an overlapping welded joint 232, but can be of any design suitable to the requirements of the particular application of the IEDM 200.

Referring again to FIG. 4, a forward end of the aft end cap 214 is attached to the outer skin 208 at the third joint 234, and an aft end of the aft end cap 214 is attached to the exhaust pipe 206 at the fourth joint 236. The third joint 234 between the aft end cap 214 and outer skin 208, and the fourth joint 236 between the aft end cap 214 and exhaust pipe 206 are generally overlapping welded joints, similar to the second joint 232. While welded joints are shown, they can be of any design suitable to the requirements of the particular application of the IEDM 200.

Additionally, the forward portion of the exhaust pipe 206 is terminated in such a way as to not impede the acoustic liner's thermal growth. This can be accomplished by flaring the exhaust pipe 206 at the forward end and forming a sliding joint 238 between the exhaust pipe 206 and acoustic liner 210, as shown in FIG. 4.

The details concerning replacement of the acoustic liner 210 is divided into three methods. Method 1 removes the acoustic liner 210 through the forward end of the IEDM 200. Method 2 removes the acoustic liner 210 through the aft end of the IEDM 200. Both methods 1 and 2 are suitable for use on a Type I configuration (shown in FIG. 5). Method 3 also removes the acoustic liner 210 through the forward end of the IEDM 200 and is only practical for a Type II configuration (shown in FIG. 6).

In order to remove the acoustic liner 210 from a Type I configuration, either the forward end cap 212 or the aft end cap 214 must first be removed. This is because the outside diameter of the acoustic liner 210 is larger than both the inside diameter of the exhaust pipe 206 and the smallest inside diameter of the bellmouth 202.

Method 1 is a process to remove and replace the acoustic liner 210 for a Type I configuration through the forward end of the IEDM 200. The first step is to remove the forward end cap 212. This is best accomplished by uncoupling the first joint 232 between the forward end cap 212 and the outer skin 208 (see FIG. 7). In the embodiment shown, the first joint 232 is welded. Optionally, the first joint 232 may use removable fasteners. After the joint 232 is uncoupled, a removable subassembly including the bellmouth 202, forward end cap 212, and acoustic liner 210 can be removed from the forward end of the IEDM 200. After this subassembly is removed, the acoustic liner 210 is unfastened from the aft portion of the bellmouth 202 by removing the fasteners 224 (see FIG. 5). A new acoustic liner 210 can then be fastened to the bellmouth 202 with fasteners 224. The subassembly with new acoustic liner 210 is then reinserted into the IEDM 200, with the new acoustic liner 210 sliding into the exhaust pipe 206 at sliding joint 238. The first joint 232 between the forward end cap 212 and the outer skin 208 can then be repaired or replaced with an alternate joint.

Method 2 is a process to remove and replace the acoustic liner 210 for a Type I configuration through the aft end of the IEDM 200. The aft end cap 214 and exhaust pipe 206 must first be removed. This is best accomplished by uncoupling the second joint 234 between the aft end cap 214 and the outer skin 208 (see FIG. 4). If the second joint 234 is made by any means other than removable fasteners, such as welded joint, it is preferable to uncouple the joint circumferentially around the outer skin 208. After the second joint 234 is uncoupled, a subassembly including the aft end cap 214 and exhaust pipe 206 can be removed from aft end of the IEDM 200. Next, the fasteners 224 that attach the acoustic liner 210 to the aft portion of the bellmouth 202 are removed. The acoustic liner 210 is then removed through the aft end of the IEDM 200 and a new acoustic liner 210 is inserted in the reverse manner. The fasteners 224 that attach the new acoustic liner 210 to the aft portion of the bellmouth 202 are then reinstalled (or replaced if not reusable). The subassembly with new acoustic liner 210 is then positioned proximate the aft end of the IEDM 200. The exhaust pipe 206 is slid over the new acoustic liner 210 at sliding joint 238. The second joint 234 between the aft end cap 214 and the outer skin 208 can then be repaired or replaced by an alternate joint.

Method 3 is a process to remove and replace the acoustic liner 210 for a Type II configuration through the forward end of the IEDM 200, which is greatly simplified over that of a Type I configuration. Referring now to FIG. 6, the fasteners 228 that hold the bellmouth 202, forward end cap 212 and acoustic liner 210 are removed. The bellmouth 202 is then removed and the acoustic liner 210 may be slid out from forward end of the IEDM 200. A new acoustic liner 210 is installed by sliding in into the IEDM 200, making sure that the acoustic liner 210 slideably couples with the exhaust pipe 206 (see sliding joint 236 in FIG. 4). The bellmouth 202 is then positioned in place and fasteners 228 are reinstalled (or replaced if not reusable). Alternately, Method 1 or Method 2 can also be used, with only minor variation, to replace the acoustic liner 210 of Type II configuration if desired.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of replacing an acoustic liner in an integrated exhaust duct muffler ("IEDM") having a bellmouth coupled to a forward end cap at a forward end of the IEDM, an exhaust pipe coupled to an aft end cap at an aft end of the IEDM, and a muffler section coupled to the bellmouth via the forward end cap and coupled to the exhaust pipe via the aft end cap, the muffler section including an outer skin housing a plurality of baffles slideably coupled to the acoustic liner, the acoustic liner additionally being removeably coupled to the bellmouth and slideably coupled to the exhaust pipe, the method comprising:

removing a subassembly consisting of the bellmouth, the forward end cap, and the acoustic liner, from the forward end of the IEDM;

removing the acoustic liner from the subassembly;

attaching a new acoustic liner to the subassembly, resulting in a new subassembly;

inserting the new subassembly consisting of the bellmouth, the forward end cap, and the new acoustic liner, into the IEDM; and attaching the new subassembly with new acoustic liner to the forward end of the IEDM.

2. The method of claim 1, wherein the subassembly consisting of the bellmouth, the forward end cap, and the acoustic liner, is coupled to the outer skin of the muffler section of the IEDM, and wherein the step of removing the subassembly from the forward end of the IEDM includes uncoupling the subassembly from the outer skin of the muffler section of the IEDM.

3. The method of claim 2, wherein the step of attaching the new subassembly with new acoustic liner to the forward end of the IEDM further includes coupling the new subassembly to the outer skin of the muffler section of the IEDM.

4. The method of claim 1 wherein the acoustic liner is fastened to the subassembly consisting of the bellmouth, the forward end cap, and the acoustic liner, and the step of removing the acoustic liner from the subassembly includes unfastening the acoustic liner from the subassembly.

5. The method of claim 4, wherein the step of attaching the new acoustic liner to the subassembly further includes fastening the acoustic liner to the subassembly.

6. A method of replacing an acoustic liner in an integrated exhaust duct muffler ("IEDM") having a bellmouth coupled to a forward end cap at a forward end of the IEDM, an exhaust pipe coupled to an aft end cap at an aft end of the IEDM, and a muffler section coupled to the bellmouth via the forward end cap and coupled to the exhaust pipe via the aft end cap, the muffler section including an outer skin housing a plurality of baffles slideably coupled to the acoustic liner, the acoustic liner additionally being removeably coupled to the bellmouth and slideably coupled to the exhaust pipe, the method comprising:

removing a subassembly consisting of the aft end cap and the exhaust pipe from the aft end of the IEDM;

withdrawing the acoustic liner from the muffler section through the aft end of the IEDM;

inserting a new acoustic liner into the muffler section through the aft end of the IEDM; and attaching the subassembly consisting of the aft end cap and the exhaust pipe to the aft end of the IEDM.

7. The method of claim 6, wherein the subassembly consisting of the aft end cap and the exhaust pipe is coupled to the outer skin of the muffler section of the IEDM, and wherein the step of removing the subassembly includes uncoupling the subassembly from the outer skin of the muffler section of the IEDM.

8. The method of claim 7, wherein the step of attaching the subassembly consisting of the aft end cap and the exhaust pipe further includes coupling the subassembly to the outer skin of the muffler section of the IEDM.

9. The method of claim 6, wherein the acoustic liner is fastened to the bellmouth, and the step of withdrawing the acoustic liner from the muffler section includes unfastening the acoustic liner from the bellmouth.

10. The method of claim 9, wherein the step of inserting the new acoustic liner into the muffler section further includes fastening the acoustic liner to the bellmouth.

11. A method of replacing an acoustic liner in an integrated exhaust duct muffler ("IEDM") having a bellmouth coupled to a forward end cap at a forward end of the IEDM, an exhaust pipe coupled to an aft end cap at an aft end of the IEDM, and a muffler section coupled to the bellmouth via the forward end cap and coupled to the exhaust pipe via the aft end cap, the muffler section including an outer skin housing a plurality of baffles slideably coupled to the acoustic liner, the acoustic liner additionally being removeably coupled to the bellmouth and the forward end cap at a common joint, and slideably coupled to the exhaust pipe, the method comprising:

uncoupling the joint between the bellmouth, the forward end cap, and the acoustic liner;

removing the bellmouth from the IEDM;

withdrawing the acoustic liner through the forward end of the IEDM;

inserting a new acoustic liner through the forward end of the IEDM;

reinstalling the bellmouth on the IEDM; and recoupling the joint between the bellmouth, the forward end cap, and the new acoustic liner.

12. The method of claim 11, wherein the joint between the bellmouth, the forward end cap, and the acoustic liner is a fastened joint, and wherein the step of uncoupling the joint includes unfastening the joint.

13. The method of claim 12, wherein the step of recoupling the joint between the bellmouth, the forward end cap, and the new acoustic liner further includes fastening the joint.

14. The method of claim 12, wherein the acoustic liner is radially located between the smallest outside circumferential dimension of the bellmouth and the smallest inside circumferential dimension of the forward end cap.

* * * * *